No. 780,042. PATENTED JAN. 17, 1905.
J. KOENIG & J. J. KLEIN.
FISH NET FLOAT.
APPLICATION FILED MAY 7, 1904.
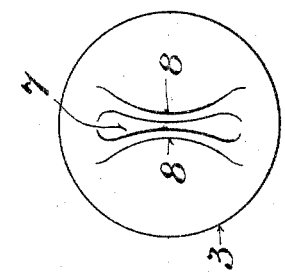
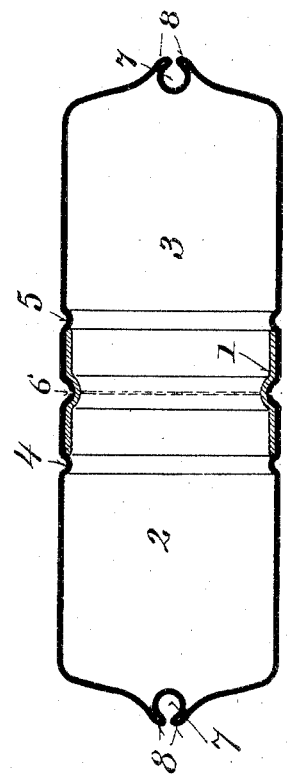
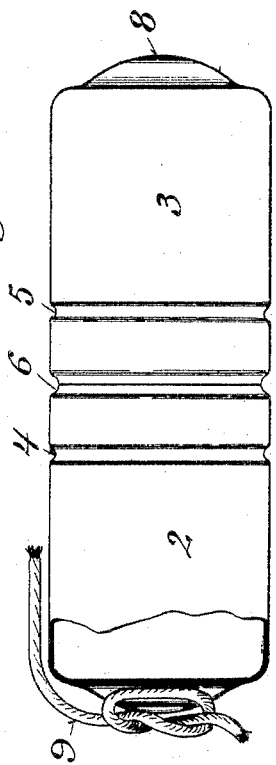

No. 780,042. Patented January 17, 1905.

UNITED STATES PATENT OFFICE.

JOSEPH KOENIG AND JOHN J. KLEIN, OF TWO RIVERS, WISCONSIN, ASSIGNORS TO ALUMINUM MANUFACTURING COMPANY, OF TWO RIVERS, WISCONSIN.

FISH-NET FLOAT.

SPECIFICATION forming part of Letters Patent No. 780,042, dated January 17, 1905.

Application filed May 7, 1904. Serial No. 206,835.

*To all whom it may concern:*

Be it known that we, JOSEPH KOENIG and JOHN J. KLEIN, both citizens of the United States, and residents of Two Rivers, in the county of Manitowoc and State of Wisconsin, have invented certain new and useful Improvements in Fish-Net Floats; and we do hereby declare that the following is a full, clear, and exact description thereof.

Our invention has especial reference to hollow air-tight floats which are attached to fish-nets; and it consists in certain peculiarities of construction and combination of parts, as will be fully set forth hereinafter in connection with the accompanying drawings and subsequently claimed.

In the said drawings, Figure 1 is a central longitudinal sectional view of our said device. Fig. 2 is a plan view thereof, partly broken away, and also illustrating the manner of fastening the float to a fish-net. Fig. 3 is an end view of our device.

Referring by numerals to the said drawings, 1 represents a short open-ended cylinder of suitable metal, such as aluminium, and 2 3 are two tubes, each closed at one end and open at the other. The drawings represent the finished article; but in the process of manufacture the cylinder 1 is entirely cylindrical and has an exterior diameter a trifle larger than the inside diameter of the tubes 2 3, so that when same are forced upon the said cylinder they will make a very tight fit, so as to be air-tight and water-tight. The said tubes 2 3 are formed with the annular grooves 4 5, which thus form annular convex ribs on the inner surface of said tubes and constitute stops which come against the end edges of the cylinder 1 in the assembling of the float. When this has been done, the annular groove 6 is formed at the center, thus depressing the cylinder 1, as well as the adjacent ends of the tubes 2 3, and securely binding said ends within the depression thus formed in the said cylinder. The outer ends of the tubes 2 3 after being spun closed are pressed to form the transverse grooves 7, nearly or quite closed by the walls 8 8, the said grooves 7 being, in effect, tubes to receive the cords 9 by which the floats are to be fastened to the fish-nets.

As thus made our floats are very light and strong and practically air and water tight and will be found very useful for the purpose designed.

While we prefer to form the described transverse practically tubular grooves 7 at each end of the float, it is desirable that at lest one end should be thus formed for the purpose of proper attachment to the net.

Having thus described our invention, what we claim as new, and desire to secure by Letters Patent, is—

1. A fish-net float comprising a hollow shell formed of two tubes, closed at their outer ends and having a tight fit on a separate central cylinder, the adjacent ends of the two tubes being held to said cylinder by a central transverse annular groove in the latter, and the correspondingly annular depression of the tube-ends, together with said separate central cylinder.

2. A fish-net float comprising a hollow shell formed of two tubes with closed outer ends and open inner ends driven over a central open-ended cylinder, the said tubes being formed with annular grooves to serve as stops against the ends of said cylinder, and held thereto by the engagement of a central annular groove or depression in the cylinder, and the correspondingly-depressed ends of the said tubes, together with said central open-ended cylinder.

3. A fish-net float comprising a closed hollow shell having transverse practically tubular grooves at its ends for the reception of cords for fastening said floats to a net.

4. A fish-net float comprising a hollow shell formed of two tubes closed at their outer ends and driven over a central open-ended cylinder, and held thereto by means of annular grooves or depressions formed in said parts, the outer ends of said tubes being formed with transverse practically tubular grooves, in combination with cords in engagement with said ends for fastening said floats to a net, and said central open-ended cylinder.

5. A fish-net float comprising a wholly-closed hollow shell having one of its closed ends formed with a transverse groove, the walls of which approach each other so closely as to form practically a tube for the reception of a fastening cord.

In testimony that we claim the foregoing we have hereunto set our hands, at Two Rivers, in the county of Manitowoc and State of Wisconsin, in the presence of two witnesses.

JOSEPH KOENIG.
JOHN J. KLEIN.

Witnesses:
W. J. WRIETH,
G. A. MAGEE.